(12) United States Patent
Paczkowski et al.

(10) Patent No.: US 12,301,012 B2
(45) Date of Patent: May 13, 2025

(54) SYSTEMS AND METHODS FOR AN AMBIENT ELECTROMAGNETIC POWER HARVESTING CHIP READER-WRITER APPARATUS

(71) Applicant: T-Mobile Innovations LLC, Overland Park, KS (US)

(72) Inventors: Lyle Walter Paczkowski, Mission Hills, KS (US); Lyle T. Bertz, Lee's Summit, MO (US); Harry William Perlow, Palm Harbor, FL (US); Pei Hou, Centreville, VA (US); Mark Richard Bales, Lee's Summit, MO (US)

(73) Assignee: T-Mobile Innovations LLC, Overland Park, KS (US)

( * ) Notice: Subject to any disclaimer, the term of this patent is extended or adjusted under 35 U.S.C. 154(b) by 374 days.

(21) Appl. No.: 17/816,970

(22) Filed: Aug. 2, 2022

(65) Prior Publication Data

US 2024/0047993 A1     Feb. 8, 2024

(51) Int. Cl.
*H02J 50/00*     (2016.01)
*H02J 50/20*     (2016.01)
(Continued)

(52) U.S. Cl.
CPC ............ *H02J 50/001* (2020.01); *H02J 50/20* (2016.02); *H02J 50/80* (2016.02); *G08C 17/02* (2013.01); *H04Q 2209/886* (2013.01)

(58) Field of Classification Search
CPC .......... H02J 50/001; H02J 50/20; H02J 50/80; H02J 7/00034; H04B 5/79
See application file for complete search history.

(56) References Cited

U.S. PATENT DOCUMENTS

| 10,050,470 B1 | 8/2018 | Leabman |
| 11,258,302 B1 | 2/2022 | Marquardt et al. |

(Continued)

OTHER PUBLICATIONS

Notice of Allowance received for U.S. Appl. No. 17/816,972, mailed on Mar. 21, 2024, 7 pages.

*Primary Examiner* — Benyam Haile
(74) *Attorney, Agent, or Firm* — Shook, Hardy & Bacon L.L.P.

(57) ABSTRACT

Systems and methods for ambient electromagnetic power harvesting (AEPH) chip reader-writer devices are provided that selectively control RF parameters of electro-magnetic (EM) signals transmitted to an AEPH chip. In embodiments, the selection of which RF parameter configuration is applied when transmitting an EM signal is determined by an RF parameter selection processor based on the function being invoked from the AEPH chip. In one embodiment, an AEPH chip reader-writer selects a first configuration of radio frequency (RF) parameters from a plurality of RF parameters based on a determination of a first operation for execution by an ambient electromagnetic power harvesting chip; configures an RF transmit path circuit to use the first configuration of RF parameters; and initiates execution of the first operation in the ambient electromagnetic power harvesting chip by transmitting via the RF transmit path circuit a first electromagnetic signal using the first configuration of RF parameters.

18 Claims, 9 Drawing Sheets

(51) Int. Cl.
*H02J 50/80* (2016.01)
*G08C 17/02* (2006.01)

(56) References Cited

U.S. PATENT DOCUMENTS

| | | |
|---|---|---|
| 2016/0100312 A1 | 4/2016 | Bell et al. |
| 2016/0299210 A1 | 10/2016 | Zeine |
| 2022/0385109 A1* | 12/2022 | Elshafie ................. H04W 4/20 |
| 2023/0117363 A1* | 4/2023 | Abotabl ................ H04L 1/1812 |
| | | 307/104 |

* cited by examiner

SYSTEMS AND METHODS FOR AN AMBIENT ELECTROMAGNETIC POWER HARVESTING CHIP READER-WRITER APPARATUS

BACKGROUND

Radio frequency identity (RFID) chips conventionally are small inexpensive semiconductor devices that have no on-board power. When irradiated with an appropriate electromagnetic field, the RFID chip draws power from the energy in the electromagnetic field and wirelessly transmits an identity via a radio frequency. Special scanning or reading devices are used to stimulate the RFID chips with an electromagnetic field, and read information broadcast by the RFID chips in response to receiving the electromagnetic field. Conventional RFID chips may be used in inventory control systems and in other applications. Ambient electromagnetic power harvesting (AEPH) chips, in some aspects, operate in a similar fashion as RFID chips. Unlike the conventional RFID chip, an AEPH chip provides power management that enables performance of different operations. While scanning devices such as used for interfacing with RFID chips are now readily available, their functionality is limited with respect to interfacing with the different operation available from an AEPH chip.

SUMMARY

The present disclosure is directed, in part to systems and methods for an ambient electromagnetic power harvesting chip reader-writer apparatus, substantially as shown and/or described in connection with at least one of the Figures, and as set forth more completely in the claims.

Embodiments presented in this disclosure provide for, among other things, systems and methods for an AEPH reader-writer device. The AEPH reader-writer selectively controls one or more radio frequency (RF) parameters of ambient electro-magnetic (EM) signals transmitted to an ambient electromagnetic power harvesting (AEPH) chip. In embodiments, the AEPH reader-writer may programmed with a plurality of different RF parameter configurations for transmitting EM signals transmitted to the AEPH chip. The selection of which RF parameter set is applied when transmitting an EM signal is determined by logic implemented by an RF parameter selection processor based at least in part on the particular function being invoked from the AEPH chip. The RF parameter configuration used for transmitting an EM signal may specify parameters such as, but not limited to, an RF frequency, an RF signal power level, and/or an RF signal beam width. For example, the AEPH reader-writer may transmit a first EM signal having a first power level on a first frequency to illicit a first response (for example, to request information from an AEPH chip). The AEPH reader-writer may transmit a second EM signal having a second power level on a second frequency to illicit a second response (for example, to request other information from the AEPH chip). As previously mentioned, an AEPH chip receives power for operating the electronic circuits of the chip by harvesting power from the EM signals it receives. In some embodiments, the AEPH reader-writer identifies to the AEPH chip which task to initiate based at least in part on the frequency of the EM signal transmitted by the AEPH reader-writer. For example, a first tier of processing resources on the AEPH chip may be triggered by transmitting an EM signal at a first trigger frequency, while a second tier of processing resources on the AEPH chip may be triggered by transmitting an EM signal at a second trigger frequency. Another RF parameter that can be controlled by the RF parameter selection processor is the signal beam width used for transmitting the EM signal. Transmitting an EM signal with a wide beam width may be applied for scanning a large area to poll many AEPH chips at a closer distance, while a narrower beam width may be applied for communicating with a specific AEPH chip at a further distance. Combinations of each of these, or other, RF parameters may define the plurality of RF parameter configurations available for selection by the RF parameter selection processor.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached Figures, which are intended to be exemplary and non-limiting, wherein.

DETAILED DESCRIPTION

Figure 1:
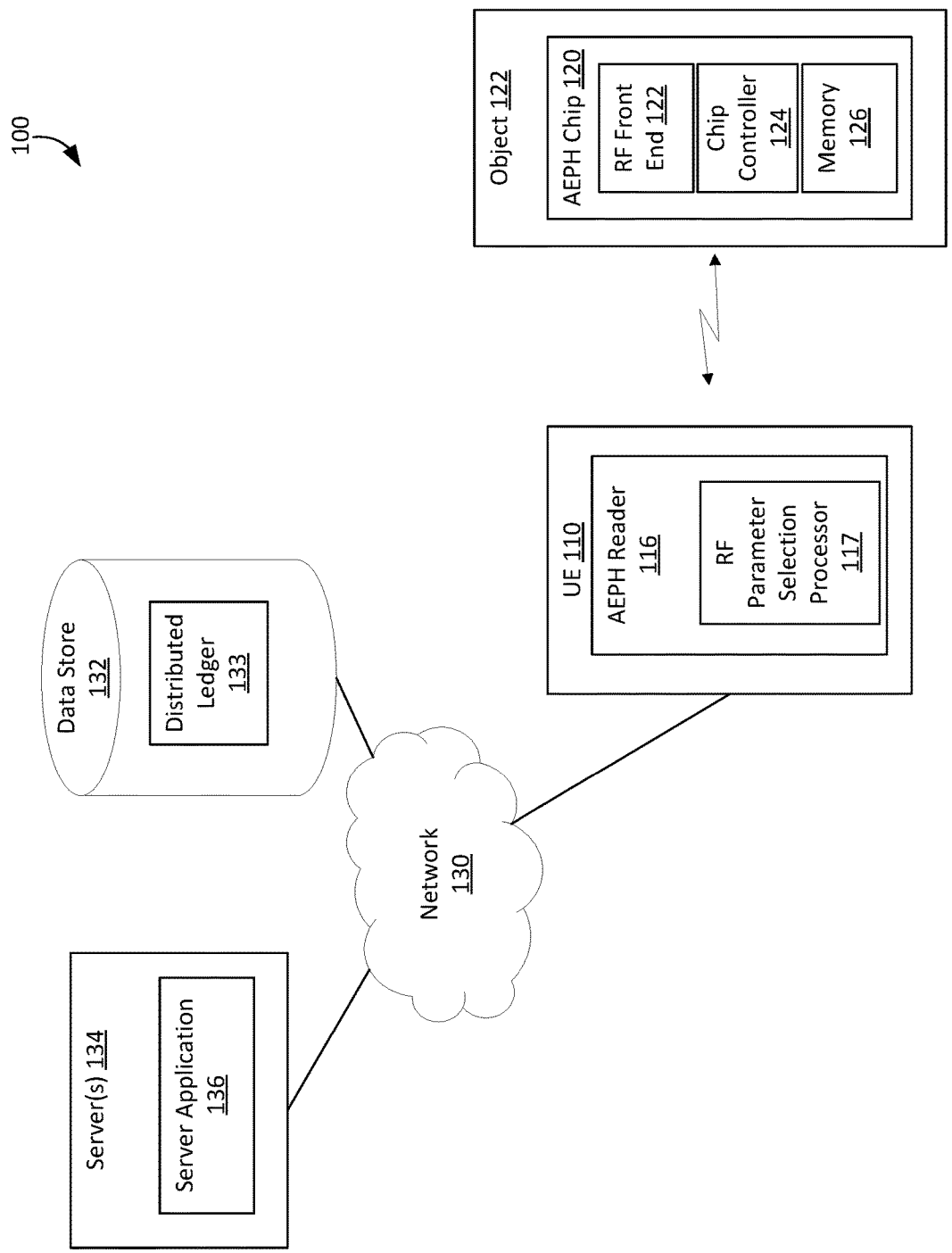
FIG. 1 is a diagram illustrating an example network environment, in accordance with some embodiments described herein.

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

One or more of the embodiments of the present disclosure provide for, among other things, systems and methods for an AEPH reader-writer device that selectively controls one or more radio frequency (RF) parameters of ambient electromagnetic (EM) signals transmitted to an ambient electromagnetic power harvesting (AEPH) chip. In the embodiments described herein, the AEPH reader-writer is programmed with a plurality of different RF parameter configurations for EM signals transmitted to the AEPH chip. The selection of which RF parameter set is applied when transmitting an EM signal is determined by logic implemented by an RF parameter selection processor based at least in part on the particular function being invoked from the AEPH chip. In some embodiments, the determination of which RF parameter is used is based on a priority indication associated with an application performing the exchange with the AEPH chip. An RF parameter configuration for transmitting an EM signal may specify parameters such as, but not limited to, an RF frequency, an RF signal power level, and/or an RF signal beam width.

For example, the AEPH reader-writer may transmit a first EM signal having a first power level on a first frequency to illicit a first response (for example, to request information from an AEPH chip). The AEPH reader-writer may transmit a second EM signal having a second power level on a second frequency to illicit a second response (for example, to request other information from the AEPH chip). As previously mentioned, an AEPH chip receives power for operating the electronic circuits of the chip by harvesting power from the EM signals it receives.

In some embodiments, the power level of the EM signal transmitted by the AEPH reader-writer is selected by the AEPH reader-writer at least in part on the expected power the AEPH chip will consume to complete the task initiated by the AEPH reader-writer. In some embodiments, tasks performed by the AEPH chip may be categorized into power consumption classes. For example, a task that merely request the AEPH to pull data from memory and transmit a response signal with that data back to the AEPH reader-writer may comprise a low power class consumption task (e.g., a class 1 task). Another task involving complex computations that need to be performed, followed by transmitting a response signal with that computed data back to the AEPH reader-writer may comprise a medium power class consumption task (e.g., a class 2 task). Still another task involving complex computations that need to be performed using encryption and decryption operations, followed by transmitting a response via a secured communication link established between the AEPH reader-writer and AEPH chip, may comprise a high power class consumption task (e.g., a class 3 task).

Moreover, in some embodiments, the AEPH reader-writer identifies to the AEPH chip which task to initiate based at least in part on the frequency of the EM signal transmitted by the AEPH reader-writer. For example, a first tier (e.g., a lower tier) of processing resources on the AEPH chip may be triggered by transmitting an EM signal at a first trigger frequency, while a second tier (e.g., a higher tier) of processing resources on the AEPH chip may be triggered by transmitting an EM signal at a second trigger frequency.

EM signal RF power levels and frequencies are two examples of RF parameters that can be controlled by the RF parameter selection processor. Another RF parameter that can be controlled by the RF parameter selection processor is the signal beam width used for transmitting the EM signal. For example, transmitting an EM signal with a wide beam width may be applied for scanning a large area to poll many AEPH chips at a closer distance, while a narrower beam width may be applied for communicating with a specific AEPH chip at a further distance. Combinations of each of these, or other, RF parameters may define the plurality of RF parameter configurations available for selection by the RF parameter selection processor.

Throughout the description provided herein several acronyms and shorthand notations are used to aid the understanding of certain concepts pertaining to the associated system and services. These acronyms and shorthand notations are intended to help provide an easy methodology of communicating the ideas expressed herein and are not meant to limit the scope of embodiments described in the present disclosure. Unless otherwise indicated, acronyms are used in their common sense in the telecommunication arts as one skilled in the art would readily comprehend. Further, various technical terms are used throughout this description. An illustrative resource that fleshes out various aspects of these terms can be found in Newton's Telecom Dictionary, 31st Edition (2018).

The subject matter described herein is generally described in the context of a wireless communications network. This is done merely for the sake of clarity and those skilled in the art may, upon reading this description, understand other contexts in which the subject matter may be utilized. For example, the embodiments disclosed herein may be implemented in the context of other networks, such as but not limited to data centers, commercial and business networks, infrastructure networks (such as an A/C power grid), economic and/or financial computing networks (such as used for high-frequency trading, flash trading, and generalized electronic trading), air traffic control networks, first responder networks (such as EMS, police, fire rescue, and the like), amongst others. Again, however, even these examples are not provided to limit the scope of this description.

As used herein, the terms "function", "unit", "node" and "module" are used to describe computer processing components and/or one or more computer executable services being executed on one or more computer processing components. In the context of this disclosure, such terms used in this manner would be understood by one skilled in the art to refer to specific network elements and not used as nonce word or intended to invoke 35 U.S.C. 112(f).

FIG. 1 is a diagram illustrating an example network environment 100 embodiment. Network environment 100 is but one example of a suitable network environment for use in implementing embodiments of the present disclosure and is not intended to suggest any limitation as to the scope of use or functionality of the embodiments disclosed herein. Neither should the network environment 100 be interpreted as having any dependency or requirement relating to any one or combination of components illustrated. Other arrangements and elements (e.g., machines, interfaces, functions, orders, and groupings of functions, etc.) can be used in addition to, or instead of, those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 8.

It should be understood that network environment 100 shown in FIG. 1 is an example of one suitable operating environment. Among other components not shown, network environment 100 includes user equipment (UE), such as UE 110, at least one network 130, a data store 132, and one or more servers 134. These components may communicate with each other via network 130, which may be wired, wireless, or both. Network 130 can include multiple networks, or a network of networks, but is shown in simple form so as not to obscure aspects of the present disclosure. By way of example, network 130 can include one or more wide area networks (WANs), one or more local area networks (LANs), one or more public networks such as the Internet, and/or one or more private networks. Where network 130 includes a wireless telecommunications network, components such as a base station, a communications tower, or even access points (as well as other components) may provide wireless connectivity. Networking environments are commonplace in offices, enterprise-wide computer networks, intranets, and the Internet. In some embodiments, network environment 100 comprises at least a portion of a wireless communications network such as described with respect to FIG. 7A.

It should be understood that any number of user devices, servers, and other components may be employed within network environment 100 within the scope of the present disclosure. Each may comprise a single device or multiple devices cooperating in a distributed environment. UE 110 are in general, forms of equipment and machines such as but, not limited to, Internet-of-Things (IoT) devices and smart appliances, autonomous or semi-autonomous vehicles including cars, trucks, trains, aircraft, urban air mobility (UAM) vehicles and/or drones, industrial machinery, robotic devices, exoskeletons, manufacturing tooling, thermostats, locks, smart speakers, lighting devices, smart receptacles, controllers, mechanical actuators, remote sensors, weather or other environmental sensors, wireless beacons, cash registers, turnstiles, security gates, or any other smart device. That said, in some embodiments, UE 110 may also include handheld personal computing devices such as cellular phones, tablets, and similar consumer equipment, or stationary desktop computing devices, workstations, servers and/or network infrastructure equipment. As such, the UE 110 may include both mobile UE and stationary UE. The UE 110 can include one or more processors, and one or more non-transient computer-readable media for executing code to carry out the functions of the UE 110 described herein. The computer-readable media may include computer-readable instructions executable by the one or more processors.

Network 130 can include multiple networks, or a network of networks, but is shown in simple form so as to obscure aspects of the present disclosure. By way of example, network 130 can include one or more wide area networks (WANs), one or more local area networks (LANs), one or more public networks such as the Internet, and/or one or more private networks. Where network 130 includes a wireless telecommunications network, the network may include components such as a base station, a communications tower, or access points (as well as other components) to provide wireless connectivity. Such an example telecommunications network is described below with respect to FIG. 7A. In some embodiments, the network 130 comprises a network edge that defines the boundary of a network operator core and serve as the architectural demarcation point where the network operator core connects to other networks such as, but not limited to the Internet, or other third-party networks. It should be understood that in some aspects, the network environment 100 may not comprise a distinct network operator core, but rather may implement one or more features of the network operator core within other portions of the network, or may not implement them at all, depending on various carrier preferences.

As shown in FIG. 1, the UE 110 comprises or is otherwise configured to implement an AEPH reader-writer 116, which may be used for communicating with at least one AEPH chip 120. AEPH chip 120 includes power management and other functionalities that perform different task and/or operations when exposed to different levels of available ambient EM power at different frequencies. In this embodiment, the AEPH chip 120 is shown as comprising an RF front end 122, a chip controller 124, and a memory 126.

An example of such an AEPH chip 120 may be found in U.S. Pat. No. 11,258,302 "Ambient electromagnetic power harvesting chip adaptation based on available power level", granted Feb. 22, 2022, which is incorporated herein by reference in its entirety. However, it should be understood that this is just an example and in other embodiments, the AEPH reader-writer 116 may work in conjunction with other AEPH chips.

The AEPH reader-writer 116 shown in FIG. 1 includes, amongst other components, an RF parameter selection processor 117. The AEPH reader-writer 116 is programmed to utilize a plurality of RF parameter configuration setting for communicating with the AEPH chip 120, which are selected by the RF parameter selection processor 117. Based on one or more determinations made by the RF parameter selection processor 117, the AEPH 116 is selectively configured to transmit different configurations of EM power signals to the AEPH chip 120 in order activate, power, and interact with the AEPH chip 120, and in order to perform different task and/or operations.

The selection of which RF parameter configuration is applied by the AEPH reader-writer 116 may be determined by the RF parameter selection processor 117 based on various considerations. One the consideration would be the particular task or operation to be invoked from the AEPH chip 120. The RF parameter selection processor 117 may specify parameters for transmitting the EM signal such as, but not limited to, an RF frequency, an RF signal power level, and/or an RF signal beam width.

In some embodiments, the AEPH reader-writer 116 may communicate (for example, via network 130) with at least one server application 136 hosted by a server 134, and/or a distributed ledger 133 hosted by a data store 132. The distributed ledger may comprise a blockchain based distributed ledger such as, but not limited to, a HyperLedger for example. In one embodiment, the server application 136 comprises a backend application for tracking and/or managing transactions of physical objects 122 (such as products, inventory, packages, for example), where the AEPH chip 120 is either embedded within, or affixed to, the object 122. In some embodiments, the server application 136 may comprise an enterprise GS1 Standards supply chain and/or inventory management application. For example, in some embodiments, the AEPH reader-writer 116 may read identification information, such as but not limited to, one or more GS1 Identification Numbers, from the AEPH chip 120 that is relevant to the object 122. Such identification information may include, for example, trade item information, supply chain partner information, product serial numbers, product batch/lot numbers, logistic information such as container codes, or similar product related information. Based on the identification information, the AEPH reader-writer 116 may further query the server application 136 to obtain additional information about the object 122, and/or to carry out and record an operation using the AEPH chip 120.

In some embodiments, the server application 136 may communicate with the distributed ledger 133 to obtain information about the object 122 in response to identification information read from the AEPH chip 120. For example, a manufacture or vendor of the object 122 may have previously recorded data pertaining to the object 122 to the distributed ledger 133. The server application 136 may also record operations between the AEPH reader-writer 116 and AEPH chip 120 to the distributed ledger 133. For example, the AEPH reader-writer 116 and AEPH chip 120 may execute a operational function on the AEPH chip 120 that documents a transfer of ownership of the object 122. The AEPH reader-writer 116 may communicate the operations details (such as a serial numbers, time, date, identification of involved parties, for example) to the server application 136 which then records the operational details to the distributed ledger 133. In some embodiments, rather than (or in addition to) the AEPH reader-writer 116 communicating with the distributed ledger 133 via the server application 136, the distributed ledger 133 itself comprises one or more smart contracts that one or more applications on the AEPH reader-writer 116 interact with directly.

In one implementation, the AEPH reader-writer 116 may transmit a first EM signal using a first set of RF parameters (having a first power level and a first frequency) to the AEPH chip 120 to initialize the AEPH chip 120 and receive in return a first set of information (for example, identification information). The AEPH reader-writer 116 may process the first set of information, either internally and/or by sending the information to the server application 136. Based on the content of the first set of information, the AEPH reader-writer 116 may proceed to execute one or more further interactions with the AEPH chip 120. In that case, the RF parameter selection processor 117 selects a configuration of RF parameters corresponding to those further interactions (e.g., based on what tasks are involved in the subsequent interactions).

In some implementations, the AEPH reader-writer 116 may proceed to transmit a second EM signal of a second frequency that triggers a second, more computationally complex, task performed by the chip controller 124 within the AEPH chip 120. This second EM signal is transmitted at a second power level commensurate with the power that the AEPH chip 120 will need to consume to complete the more computationally complex task. For example, the second task may involve a secure transaction involving encryption and/or computation of a digital signature and/or establishing a secure bi-directional communication link with AEPH reader-writer 116 (which may comprise a channel that operates at the same frequency as the second EM signal, or at a different channel frequency). In some embodiments, the task may further involve the AEPH reader-writer 116 writing information to the memory 126 of the AEPH chip 120, and/or the AEPH chip 120 storing data computed by the chip controller 124 to the memory 126. The AEPH reader-writer 116 may also transmit one or more updates to the distributed ledger 133 based at least in part on a response signal generated by the AEPH chip 120 from executing operations.

For each EM signal transmitted by AEPH reader-writer 116 to the AEPH chip 120, the RF parameter selection processor 117 functions to configure the AEPH reader-writer 116 to transmit the signal with an RF configuration corresponding to a set of RF parameters associated with the task to be executed by the AEPH chip 120. The RF parameter selection processor 117 may also configure the AEPH reader-writer 116 to receive and process the expected response from the AEPH chip 120. The determination of the specific RF parameter configuration selected by the RF parameter selection processor 117 may be based on one or more factor such as, for example, information received from the AEPH chip 120, information received from the server application 136, information received from the distributed ledger 133 and/or information from one or more applications (including but not limited to distributed applications, or Dapps) executed by the AEPH reader-writer 116. Moreover, it should be understood that any one task or transaction between the AEPH reader-writer 116 and the AEPH chip 120 may involve a sequence of several EM signal transmissions to invoke a set of various subtasks within the AEPH chip 120.

Figure 2:
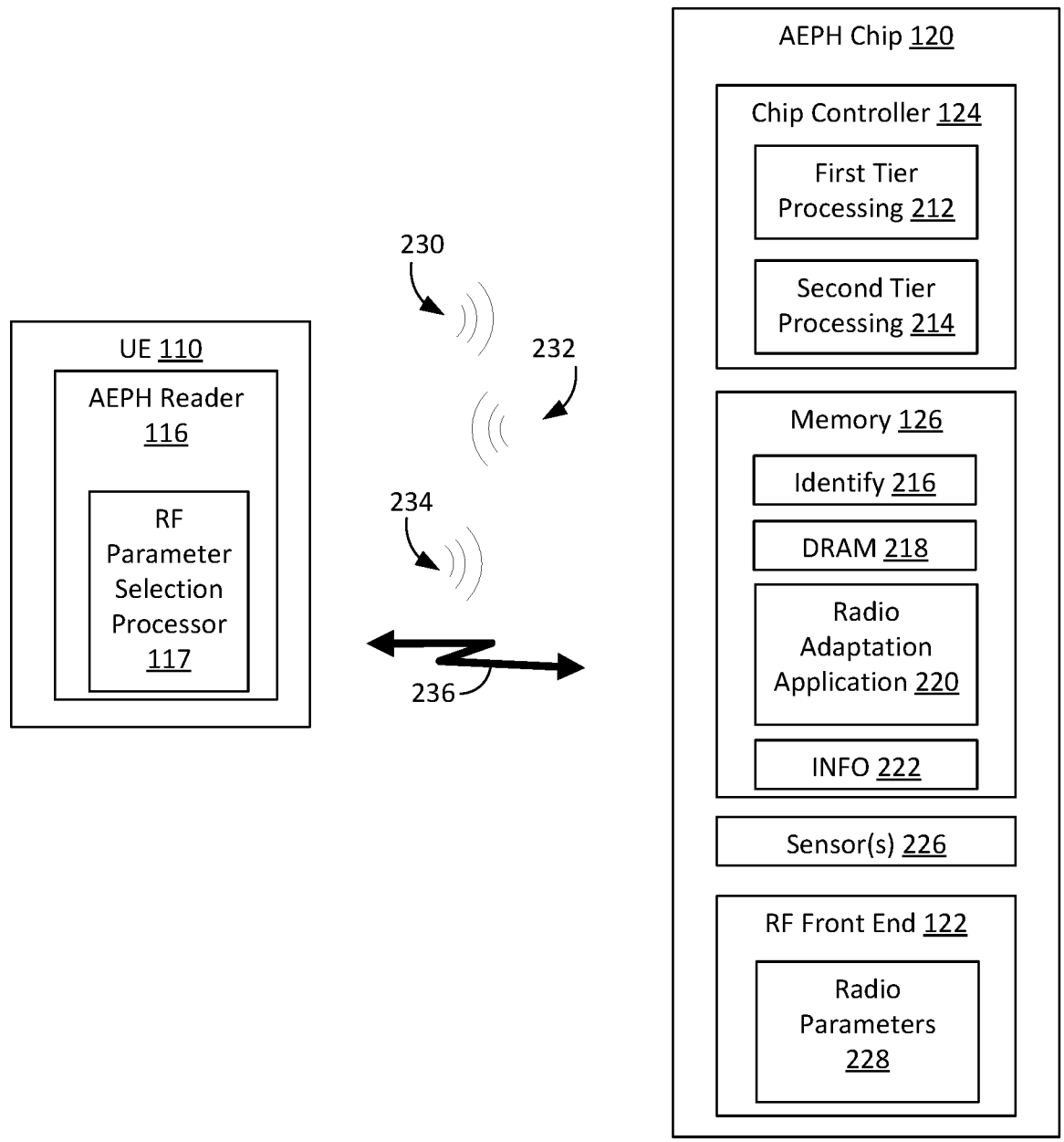
FIG. 2 is a diagram illustrating an example user equipment and AEPH chip, in accordance with some embodiments described herein.

Turning now to FIG. 2, FIG. 2 illustrates an example AEPH chip 120 that may be used in conjunction with the AEPH reader-writer 116 in accordance with embodiments of this disclosure. In an embodiment, the AEPH 120 comprises chip controller 124 (e.g., comprising one or more processors or processor cores), memory 126, and an RF front end 122 (e.g., radio circuitry). In some embodiments, in a first mode of operation, the AEPH chip 120 harvests power from a relatively low-power ambient electromagnetic power field emitted as an EM signal 230 from the AEPH reader-writer 116. The RF parameter selection processor 117 may configure the AEPH reader-writer 116 to produce low-power EM signal 230 in a frequency band such as, but not limited to, a 900 MHz frequency band, a 1.9 GHz ISM frequency band, a 2.4 GHz ISM frequency band and/or other Industrial, Scientific, and Medical (ISM) frequency bands. Although the EM signals exchanged between the UE 110 and AEPH chip 120 are generally described herein in the context of wireless EM signals, embodiments are not so limited. It should be understood that in some embodiments, EM signals exchanged between the UE 110 and AEPH chip 120 may be carried by electrical conductors.

When the AEPH chip 120 harvests power from the low-power ambient EM signal 230, the functionality of the AEPH chip 120 may be restricted. For example, only a first tier processing 212 of the chip controller 124 may be active, or only an identity 216 stored in the memory 126 may be accessible and may not be writeable (other parts of the memory 126 may not be readable or writeable in the first mode of operation). For example, the RF front end 122 may support transmitting a reply signal 232 (e.g., carrying the identity 216 or other response). However, in this low-power operation, the reply signal 232 may only be transmitted at a low data rate.

In a second mode of operation, the RF parameter selection processor 117 may configure the AEPH reader-writer 116 to transmit a medium-power or high-power EM signal 234. In response, the AEPH chip 120 harvests power from the medium-power or high-power EM signal 234. When the AEPH chip 120 harvests power from the EM signal 234, the functionality of the AEPH chip 120 may not be restricted and additional functionality may be operational. For example, in addition to the first tier of processing 212, the chip controller 124 may further provide a second tier of processing 214. In addition to the identity 216, a dynamic random access memory (DRAM) 218 may be activated and be readable and writeable in the second mode of operation of the AEPH chip 120. A DRAM 218 may provide support for some of the second tier processing 214, for example by permitting the chip controller 124 to load instructions from a non-transitory memory portion of the memory 126 into the DRAM 218 and executing the instructions by the chip controller 124 out of the DRAM 218.

In some embodiments, a radio adaptation application 220 stored in the memory 126 may be accessible and may be executed in the second tier of processing 214 of the chip controller 124, for example by virtue of loading at least some of the radio adaptation application 220 into the DRAM 218 by the chip controller 124 and executing those instructions out of DRAM 218. The RF parameter selection processor 117 controls RF parameters of the EM signals transmitted by the AEPH reader-writer 116 such that the low-power EM signal 230 is transmitted at a power level commensurate with completing tasks for the first tier processing 212 and such that the medium-power or high-power EM signal 234 is transmitted at a power level commensurate with completing tasks for the second tier processing 214.

Moreover, in some embodiments, first tier processing 212 and second tier processing 214 are each respectively activated by ambient EM power fields of different respective frequencies. For example, first tier processing 212 may be responsive to a low-power EM signal 230 in the 900 MHz ISM band, while second tier processing 214 may be responsive to a medium-power or high-power EM signal 234 in the 2.4 GHz ISM band. As is done for power, the RF parameter selection processor 117 controls RF parameters of the EM signals transmitted by the AEPH reader-writer 116 such that the low-power EM signal 230 is transmitted at a first frequency that the first tier processing 212 is responsive to, and medium-power or high-power EM signal 234 is transmitted at a second frequency that the second tier processing 212 is responsive to. In this way, activation of various different processing tasks by the AEPH chip 120 may be selectively triggered by controlling the AEPH reader-writer 116 to emit EM signals of various combinations of both power levels and frequencies.

In addition to the identity 216, a plurality of information 222 may be readable and writeable in the memory 126 in the second mode or operation. In some embodiments, in the second mode of operation, one or more sensors 226 may be powered and able to collect sense information about the environment surrounding the AEPH chip 120. In the second mode of operation, the RF front end 122 may support both radio transmitting and radio receiving. In the second mode of operation, the RF front end 122 may support operating a radio frequency power amplifier at a moderate or high level of output. In the second mode of operation, the RF front end 122 may support sophisticated functions like beam forming, and may support these sophisticated functions in different frequency bands, in different bandwidths, and at different data rates as configured in a set of radio parameters 228. In an embodiment, a power level management application by the first tier processing 212 determines the level of power that the AEPH chip 120 is harvesting and compares this level of harvested power to a predefined threshold. When the harvested level of power is below the threshold, the power level management application disables the second tier processing 214. When the harvested level of power is above the predefined threshold, the power level management application enables the second tier processing 214.

In some embodiments, the AEPH reader-writer 116 may passively receive information from the AEPH chip 120 (e.g., via response signal 232) while the AEPH chip 120 is in the first mode of operation. The AEPH reader-writer 116, for example, may receive an identity 216 broadcast by the AEPH chip 120 when in the first mode of operation and determine that it wants to communicate with the AEPH chip 120. Based on receiving and analyzing the identity 216 from the AEPH chip 120, the AEPH reader-writer 116 may begin transmitting the medium-power or high-power EM signal 234. In response to the medium-power or high-power EM signal 234, the AEPH chip 120 enters the second mode of operation and in response establish the wireless communication link 236 with the AEPH chip 120. The radio adaptation application 220 may conduct a communication initiation session with the AEPH reader-writer 116 wherein the radio adaptation application 220 determines a variety of radio parameters 228. For example, the radio adaptation application 220 may negotiate a frequency band for communication with the AEPH reader-writer 116 via wireless communication link 236. The radio adaptation application 220 may negotiate a data rate and/or radio frequency amplification power level parameters for communication with the AEPH reader-writer 116, and in some embodiments negotiate antenna beam forming parameters with the AEPH reader-writer 116. In part the negotiations between the radio adaptation application 220 and the AEPH reader-writer 116 depend upon the functional capabilities of these entities and upon the power that the AEPH chip 120 is able to harvest from the ambient EM signal from the AEPH reader-writer 116. The radio adaptation application 220 may store the negotiated radio parameters in the radio parameters 228 of the RF front end 122, for example, in a non-transitory memory portion of the RF front end 122. In some embodiments, the wireless communication link 236 may be a secured (e.g., encrypted) communication link.

In embodiments, the AEPH reader-writer 116 and AEPH chip 120 may initiate a trusted security zone communication operation mode, wherein the AEPH chip 120 executes at least part of the second tier processing in a trusted security zone of the chip controller 124. The AEPH reader-writer 116 may correspondingly transition to execution in a trusted security zone of its own processor. When executing in the trusted security zone other processes (e.g., non-trusted processes) may be halted until the trusted processing ceases. This may prevent the other processes from monitoring trusted communications and/or secure data passing between the chip controller 124, the memory 126, the RF front end 122, and sensors 226. In an embodiment, the trusted security zone portion of the chip controller 124 is not active or accessible while the AEPH chip 120 is operating in the first mode of operation.

In embodiments, the AEPH reader-writer 116 may send a message to the AEPH chip 120 to capture information from one or more of the sensors 226. In response, the second tier processing 214 commands one or more of the sensors 226 to capture information from the environment surrounding the AEPH chip 120, for example temperature sense information, atmospheric pressure sense information, humidity sense information, etc., and to store the sensor data in the memory 126, for example in a non-transitory portion of the memory 126. The AEPH reader-writer 116 may send a message to the AEPH chip 120 to send stored sensor information via the wireless communication link 236 to the AEPH reader-writer 116. The AEPH reader-writer 116 may transmit the sensor information received from the AEPH chip 120 (or a plurality of AEPH chips 120) via network 130 to the data store 132 (e.g., to distributed ledger 133). The sensor data stored in the distributed ledger 133 may be accessed by the server application 136, which may process the sensor data in various ways, including performing statistical analysis on the data.

Although FIG. 2 illustrates an AEPH chip 120 wherein first and second processing tiers may be selectively activated based on the RF configuration of EM signal selected by the RF parameter selection processor 117, it should be understood that in other embodiments, the AEPH reader-writer 116 may interact in the same manner with AEPH chips 120 comprising any number of processing tiers, selecting which tiers and operations are invoked based on the selection of a set of RF parameter configurations having corresponding power levels and/or frequencies.

Figure 3:
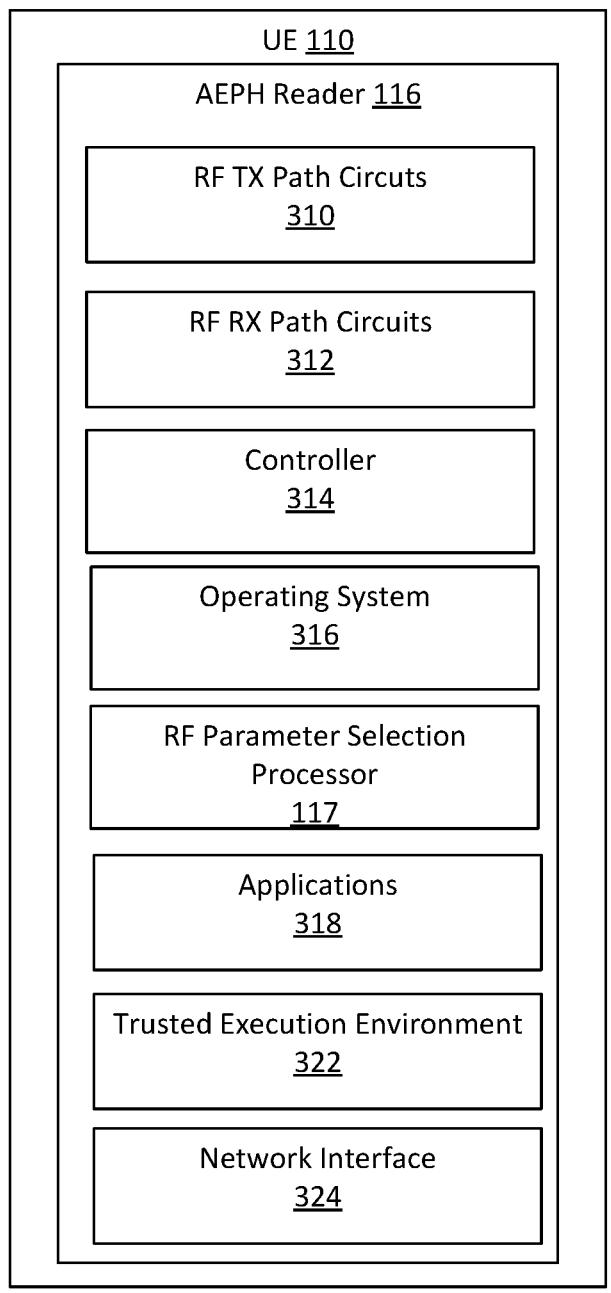
FIG. 3 is a diagram illustrating an example user equipment comprising an AEPH reader-writer, in accordance with some embodiments described herein.

With reference now to FIG. 3, FIG. 3 illustrates an example UE 110, more specifically a UE 110 that executes one or more elements of the multi-channel AEPH reader-writer 116. Although some UE's may include other components, generally UE 110 includes one or more radio frequency (RF) transmit (TX) path circuits 310, one or more RF receive (RX) path circuits 312, and a controller 314. RF TX path circuits 310 may comprise one or more radio circuit components such as, but not limited to, a modulator, digital up-converter, power amplifier, filters, digital-to-analog converters, and/or other related radio components for generating, modulating, and/or transmitting EM signals the AEPH chip 120. In some embodiments, data may be communicated by the controller 314 (or components of the AEPH reader-writer 116) to the AEPH chip 120 via the RF TX path circuits 310. RF RX path circuits 312 may comprise one or more radio circuit components such as a demodulator, digital down-converter, low-noise amplifier, filters, analog-to-digital converters, and/or other related radio components for receiving and/or demodulating RF response signals received from the AEPH chip 120. Configuration of the RF TX path circuits 310 and/or RF RX path circuits 312 may be controlled by the RF parameter selection processor 117. In some embodiments one or both of the TX path circuits 310 and/or RF RX path circuits 312 may comprise a plurality of RF path, each corresponding to different frequency bands.

In some embodiments, the RF TX path circuits 310 and RF RX path circuits 312 are used by the AEPH reader-writer 116 to transmit RF signal bursts to the AEPH chip 120 and to receive RF signal bursts from the AEPH chip 120. In some embodiments, the RF TX path circuits 310 and RF RX path circuits 312 are used by the AEPH reader-writer 116 to establish the bidirectional communications link 236 with the AEPH chip 120.

In the embodiment shown in FIG. 3, the UE 110 further includes an operating system 316 and one or more executable applications 318 that are executed by the controller 314 to implement the functions of the AEPH reader-writer 116. In this embodiment, an application layer facilitates execution of the UE operating system 316 and applications 318, which include the AEPH RF parameter selection processor 117 and other applications that initiate tasks and perform transactions with the AEPH chip 120. In some embodiments, applications 318 may include applications executed in a rich environment and/or applications executed in a trusted execution environment (TEE) 322. For example, in some embodiments, the AEPH RF parameter selection processor 117 and/or one or more of the applications 318 may be resident on the UE 110, at least in part, within a hardware Root of Trust and hosted from the TEE 322, where they are protected from tampering or manipulation. In the embodiment of FIG. 3, the AEPH reader-writer 116 further comprises at least one network interface 324, through which the AEPH reader-writer 116 can be coupled to network 130. The network interface 324 may comprise a wireless network interface or a wired network interface. One or more of the applications 318 may communicate with the network interface 324 in order to communicate via network 130 with server application 136 and/or distributed ledger 133.

Figure 4:
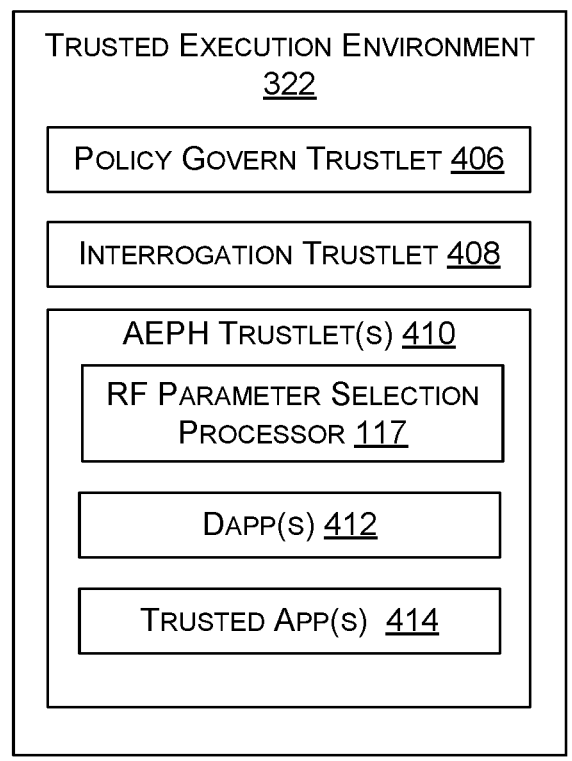
FIG. 4 is a diagram illustrating an example trusted execution environment for a user equipment comprising an AEPH reader-writer, in accordance with some embodiments described herein.

Referring now to FIG. 4, TEE 322 facilitates a secure area of the processor(s) of UE 110. That is, TEE 322 provides an environment in the UE 110 where isolated execution and confidentiality features are enforced. Example TEEs include Arm TrustZone technology, Software Guard Extensions (SGX) technology, or similar. Generally, computer readable code executed in the TEE 322 is referred to as a "trustlet". A trustlet can securely access data stored memory of the UE 110 that is otherwise inaccessible in the application layer. A trustlet may take the form of trusted processes, secure processes, isolated user mode (IUM) processes, or the like. For example, a trustlet executed in TEE 322 can access system level data (that is, data related to the larger machine the UE 110 in incorporated within), private and/or public keys, and similar data stored, or accessed, by the UE 110. Trustlets can be activated in response to various network or UE operations. For example, a trustlet can be activated by execution of an associated application 218 in the application layer. For another example, a trustlet can be activated in response to a command generated by a network element (such as server application 136). The trustlet(s) activated may vary depending on the service requested. Upon activation, a trustlet performs a set of predetermined operations. The operations can include, but are not limited to: accessing data stored by the UE, (such as a set keys that are embedded directly into a processor or microcontroller during manufacturing, certificates of authority, unique device identifiers, or any other data); monitoring operations of the UE (such as monitoring processor load, microcontroller load, activation of other UE systems, or other similar UE operations); access or monitor operations of other applications executed by the UE; writing data to the memory of UE; activate another trustlet; or any combination thereof.

In the embodiment depicted in FIG. 4, the TEE 322 illustratively includes a policy governing trustlet 406, an interrogation trustlet 408, and one or more AEPH trustlets 410. In other embodiments, a TEE 322 may include a fewer or greater number of trustlets.

Policy governing trustlet 406 corresponds to an illustrative example of computer readable code that is activated in response to execution of an application or operation. Upon activation, policy governing trustlet 406 may access a locally stored set of keys corresponding to the application and the UE's processor. Such keys may be utilized for establishing a secured communication link 236 between the AEPH reader-writer 116 and AEPH chip 120 or other secured transactions. Additionally, policy governing trustlet 406 may access a UE's unique identifier (e.g., an international mobile equipment identity (IMEI)). The policy governing trustlet 406 may communicate the accessed data to a communication network for analysis.

Interrogation trustlet 408 corresponds to an illustrative example of computer readable code that is activated in response to a command from the communication network. An interrogation trustlet can be activated by a command that is generated in response to a determination that UE 110 is an unknown device or that the UE provided anomalous data for a requested network service. In response to activation, an interrogation trustlet 408 may activate other trustlets, access additional data, or perform any other trustlet operation. The interrogation trustlet 408 may communicate the accessed data to network 130. For example, interrogation trustlet 408 can be activated in response to a command that server application 136 has requested data from one or more trustlets executed in the trusted execution environment 322. In some embodiments, one or more of the AEPH trustless 410 are activated by the interrogation trustlet 408 in response to a command from the server application 136 or instructions from the distributed ledger 133.

The AEPH trustlets 410 corresponds to an illustrative example of computer readable code that may be activated in conjunction with initiation of communications between the AEPH reader-writer 116 and an AEPH chip 120. In some embodiments, the AEPH RF parameter selection processor 117 is executed at least in part in the TEE 322. AEPH trustlets 410 may also include one or more decentralized applications 412, also known as Dapps, Dapps 412 typically operate on a blockchain or network of peer-to-peer network. In some embodiments, Dapps 412 comprise applications that engage directly with the distributed ledger 133. In some embodiments, the Dapps 412 utilize smart contracts to complete transactions between AEPH chip 120 and the distributed ledger 133 or other block chain based ledger. Likewise, one or more of the Dapps 412 can exchange information with the distributed ledger 133 based on information exchange with the AEPH chip 120. In some embodiments, one or more of the Dapps 412 may be remotely loaded to the TEE 322, for example by the server application 136. Other trusted applets 414 may also be executed as AEPH trustlets 410 to perform one or more secure operations between the AEPH reader-writer 116 and the AEPC chip 120.

In some embodiments, the RF parameter selection processor 117 determines a configuration of RF parameters for transmitting EM signals to the AEPH chip 120 based on configuration information provided from an application 318 initiating communication with the AEPH chip 120. For example, in some embodiments, a first application 318 may activate a first tier processing task of the AEPH chip 120 by explicitly providing a request to the RF parameter selection processor 117 with the necessary set of RF parameters to invoke the first tier processing task. In response, the RF parameter selection processor 117 causes the controller 314 to configure the RF TX path circuits 310 to transmit an EM signal having the specified RF parameters.

In some embodiments, the RF parameter selection processor 117 may infer the necessary set of RF parameters based on which application is initiating the task. For example, the RF parameter selection processor 117 may correlate a request from a first application 318 as belonging to a first set of applications that use a first set of RF parameters, and a request from a second application 318 as belonging to a second set of applications that use a second set of RF parameters. As an example, the first application 318 may be associated with AEPH chip 120 tasks that utilize just first tier processing 212. When the RF parameter selection processor 117 receives a request from that first application 318 it may look up (for example, from a table in memory 126) the corresponding set of RF parameters (e.g., power level and/or frequency) to activate the first tier processing 212. The second application 318 may instead be associated with AEPH chip 120 tasks that utilize second tier processing 214. When the RF parameter selection processor 117 receives a request from that second application 318 it may look up (for example, from the table in memory 126) the corresponding set of RF parameters (e.g., power level and/or frequency) to activate the second tier processing 214.

In still other embodiments, the RF parameter selection processor 117 may determine the set of RF parameters for transmitting an EM signal based on a task specification provided by the application. For example, an application 318 may send a request to the RF parameter selection processor 117 with an instruction for a task where the AEPH chip 120 is to read data from memory and transmit a response signal. The RF parameter selection processor 117 determines RF parameter configurations (e.g., power level and/or frequency) corresponding to that task and instructs the controller 314 to transmit an EM signal via the RF TX path circuits 310 having the specified RF parameter configurations. Alternatively, the application 318 may send a request to the RF parameter selection processor 117 with an instruction for a task where the AEPH chip 120 is to perform for example, complex computations, secured operations comprising encryption, decryption, and/or digital signatures, or establishing of a secured communication link 236 between the AEPH reader-writer 116 and AEPH chip 120, or other operation that may comprise a relatively higher power consumption task. Again, the RF parameter selection processor 117 determines a set of RF parameters corresponding to those relatively higher power task and causes the controller 314 to transmit an EM signal via the RF TX path circuits 310 having the specified RF parameter configuration. In some implementations, the application 318 is relived of any need of being programed with specific information about the RF operation of the AEPH chip 120 because the RF parameter selection processor 117 independently determines those parameters.

In some embodiments, the AEPH reader-writer 116 may execute an initial low-power interrogation operation of the AEPH chip 120 to obtain identification information about the AEPH chip 120. Based on this identification information, the AEPH reader-writer 116 may query a server, for example, the server 134 and/or server application 136, and receive a response comprising the set of RF parameters to be used with that AEPH chip 120 for executing its various processes.

As previously mentioned, signal beam-width is another RF parameter of EM signals transmitted by the AEPH reader-writer 116 that is configurable by the RF parameter selection processor 117. For example, an application 318 may control the beam-width of EM signals transmitted by the AEPH reader-writer 116 in order to produce an ambient EM signal broadly directed at a large group of AEPH chips 120, or more narrowly directed at a single AEPH chip 120. Transmitting an EM signal with a larger beam-width, for example, may be useful for a task where an application 318 is seeking a count of how many AEPH chips 120 are present. Transmitting an EM signal with a narrower beam-width, for example, may be useful for a task where an application 318 is seeking to interact with a specific AEPH chip 120 that is in proximity with other AEPH chips 120. In some implementations, signal power may be similarly used to control which AEPH chips 120 are activated by the AEPH reader-writer 116. For example, the power level of an ambient EM signal may be attenuated such that AEPH chips 120 relatively closer to the AEPH reader-writer 116 will be able to harvest sufficient power to initiate a task, whereas AEPH chips 120 relatively further from the AEPH reader-writer 116 will not. In some embodiments, the RF parameter selection processor 117 may combine control of EM signal beam-width and power in order to selectively filter which AEPH chips 120 the AEPH reader-writer 116 will interact with. For example, in some implementations the AEPH reader-writer 116 may control beam-width and power in order to iteratively refine a set of AEPH chips 120 down to a smaller sets to help search for and navigate to a AEPH chip affixed to a specific object.

Figure 5:
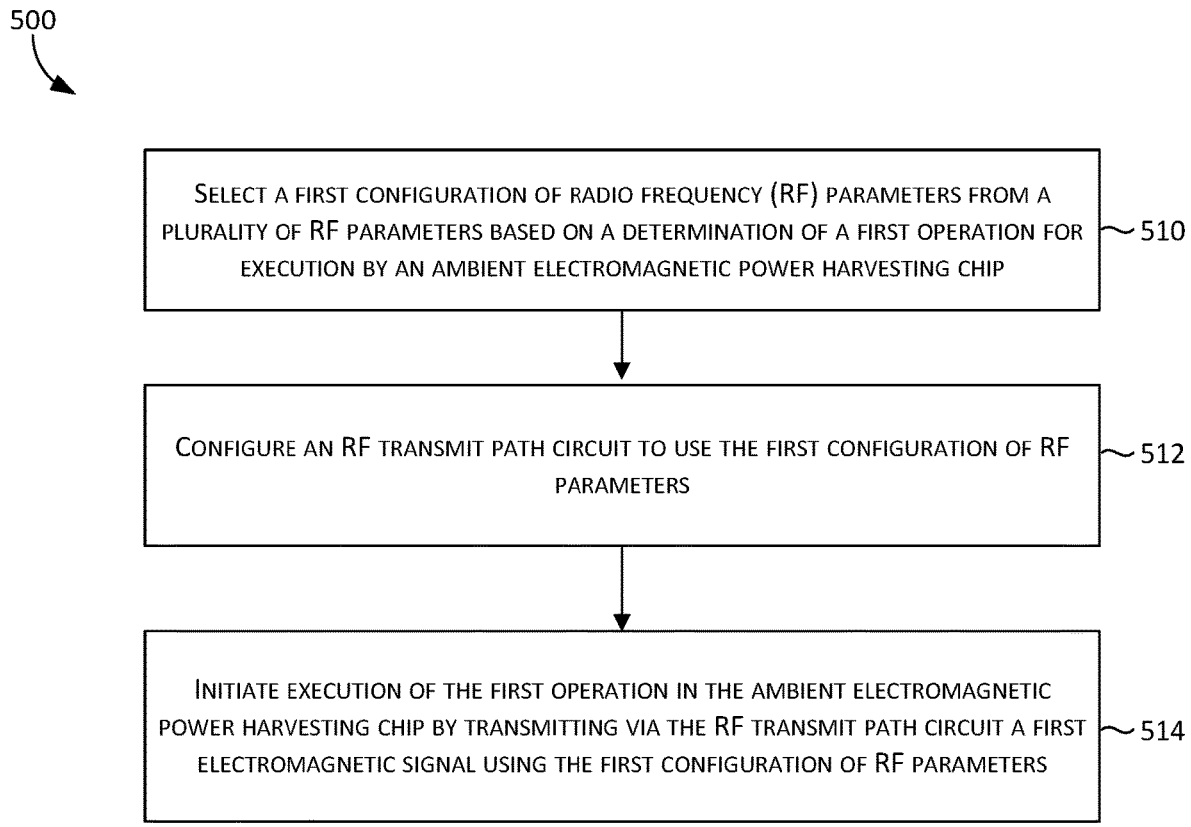
FIG. 5 is a flow chart illustrating an example method for an AEPH reader-writer, in accordance with some embodiments described herein.

FIG. 5 is a flow chart illustrating a method 500 for an AEPH reader-writer, according to one embodiment. It should be understood that the features and elements described herein with respect to the method of FIG. 5 may be used in conjunction with, in combination with, or substituted for elements of, any of the other embodiments discussed herein and vice versa. Further, it should be understood that the functions, structures, and other descriptions of elements for embodiments described in FIG. 5 may apply to like or similarly named or described elements across any of the figured and/or embodiments described herein and vice versa. In some embodiments, elements of method 500 are implemented utilizing a processor of a UE 110 as disclosed above.

The method 500 begins at 510 with selecting a first configuration of radio frequency (RF) parameters from a plurality of RF parameters based on a determination of a first operation for execution by an ambient electromagnetic power harvesting chip. In some embodiments, the selected RF configuration of parameters may specify a power level of the electromagnetic signal corresponding to a power consumption for the ambient electromagnetic power harvesting chip to complete the first operation. The selected RF configuration of parameters may also specify a frequency of the first electromagnetic signal, wherein the frequency corresponds to a predefined trigger frequency for initiating execution of the first operation. Other RF parameters may specify other RF characterizing such as a signal beam-width. The RF parameters selected may be selected from a plurality of RF parameter configuration comprising various combinations of these, or other RF parameters. In some embodiments, the selection of the RF parameter configuration may be based on at least one task associated with (e.g., performed by) the first operation, and in some embodiments, based on information previously received from the ambient electromagnetic power harvesting chip. In some embodiment, the method may include transmitting information about the ambient electromagnetic power harvesting chip to a server application or a distributed ledger, and selecting the first configuration of RF parameters based on information received from the server application or the distributed ledger.

The method proceeds to 512 with configuring an RF transmit path circuit with the first configuration of RF parameters. As previously discussed, generally a UE implementing the AEPH reader-writer includes one or more radio frequency transmit path circuits, one or more RF receive path circuits, and a controller that controls operation and configuration of the transmit and receive paths. The RF TX path circuits may comprise one or more radio circuit components such as, but not limited to, a modulator, digital up-converter, power amplifier, filters, digital-to-analog converters, and/or other related radio components for generating, modulating, and/or transmitting EM signals the AEPH chip. In some embodiments, data may be communicated to the AEPH chip via the RF TX path circuits. RF RX path circuits may comprise one or more radio circuit components such as a demodulator, digital down-converter, low-noise amplifier, filters, analog-to-digital converters, and/or other related radio components for receiving and/or demodulating RF response signals received from the AEPH chip. Configuration of the RF TX path circuits and/or RF RX path circuits may be controlled by the RF parameter selection processor. In some embodiments one or both of the TX path circuits and/or RF RX path circuits may comprise a plurality of RF paths, each corresponding to different frequency bands. That is, configuring an RF transmit path circuit and/or RF receive path circuit with a configuration of RF parameters may comprise reconfiguring components of an RF transmit path circuit and/or RF receive path circuit, or selecting an RF transmit path circuit and/or RF receive path circuit from a plurality of circuits that are pre-configured with a configuration of RF parameters.

The method 500 at 514 includes execution of the first operation in the ambient electromagnetic power harvesting chip by transmitting via the RF transmit path circuit a first electromagnetic signal using the first configuration of RF parameters. In some embodiments, depending on which operation is selected, the first operation may comprise executing a first tier of processing resources on the AEPH chip or a second tier (e.g., a higher tier) of processing resources on the AEPH chip. Tasks performed by the AEPH chip in executing the first operation may include tasks such as, but not limited to: reading information from a memory of the ambient electromagnetic power harvesting chip, saving information to the memory of the ambient electromagnetic power harvesting chip, transferring information between a distributed ledger and the memory of the ambient electromagnetic power harvesting chip, and/or establishing an encrypted communication link between the ambient electromagnetic power harvesting chip and the system. In some embodiments, the method includes transmitting a sequence of electromagnetic signal transmissions to execute a set of subtasks of an operation om the AEPH chip.

For some implementations, multiple operations may be executed by transmitting sequences of EM signals to the AEPH chip having different configurations of RF parameters. For example, in one embodiment, the method 500 may continue with determining a second configuration of RF parameters corresponding to a second operation of the ambient electromagnetic power harvesting chip, wherein the second set of RF parameters defines a second power level of the second electromagnetic signal corresponding to a power consumption for the ambient electromagnetic power harvesting chip to complete the second operation. The method would then configure the RF transmit path circuit with the second configuration of RF parameters, and initiate execution of the second operation in the ambient electromagnetic power harvesting chip by causing the RF transmit path circuit to transmit a second electromagnetic signal using the second configuration of RF parameters.

Figure 6:
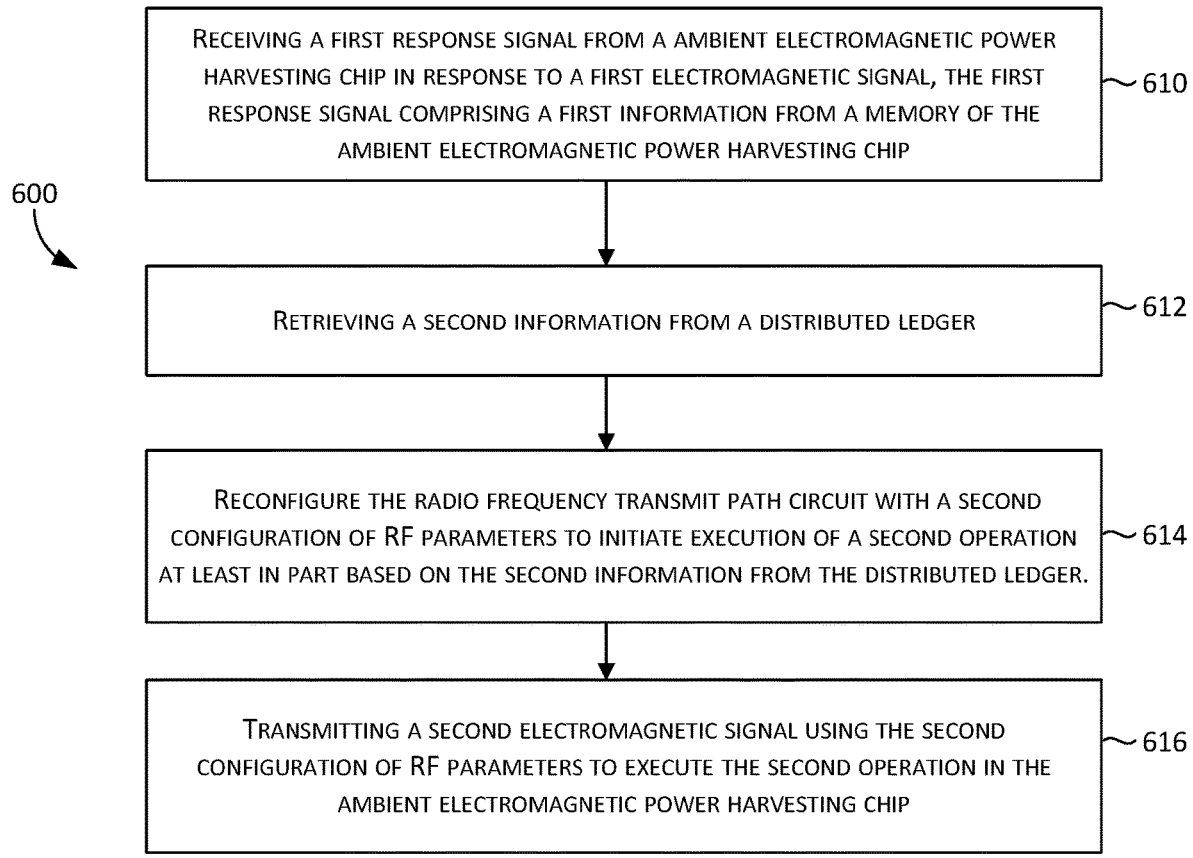
FIG. 6 is a flow chart illustrating another example method for an AEPH reader-writer, in accordance with some embodiments described herein.

FIG. 6 is a flow chart illustrating a method 600 for an AEPH reader-writer according to one embodiment. It should be understood that the features and elements described herein with respect to the method of FIG. 6 may be used in conjunction with, in combination with, or substituted for elements of, any of the other embodiments discussed herein and vice versa. Further, it should be understood that the functions, structures, and other descriptions of elements for embodiments described in FIG. 6 may apply to like or similarly named or described elements across any of the figured and/or embodiments described herein and vice versa. In some embodiments, elements of method 600 are implemented utilizing a processor of a UE 110 as disclosed above.

As discussed above, in some embodiments, the AEPH reader-writer may facilitate interactions between the AEPH chip and a distributed ledger and/or a server application. The distributed ledger can comprise a blockchain based distributed ledger such as, but not limited to, a HyperLedger, for example.

For example, in some embodiments, the AEPH reader-writer may read identification information from the AEPH chip that is relevant to an object (e.g., a product, unit of equipment, unit of inventory, and the like). Such identification information may include, for example, trade item information, supply chain partner information, product serial numbers, product batch/lot numbers, logistic information such as container codes, or similar product related information. Based on the identification information, the AEPH reader-writer may further query the server application and/or distributed ledger to obtain additional information about the object and/or to further carry out one or more additional operations using the AEPH chip. An example of such a process is illustrated by the method 600 of FIG. 6. As shown in FIG. 6, method 600 includes at 610 receiving a first response signal from a ambient electromagnetic power harvesting chip in response to a first electromagnetic signal, the first response signal comprising a first information from a memory of the ambient electromagnetic power harvesting chip. Based on the information obtained from the response signal, the method at 612 includes retrieving a second information from a distributed ledger. The method proceeds to 614 to reconfigure the radio frequency transmit path circuit with a second configuration of RF parameters to initiate execution of a second operation at least in part based on the second information from the distributed ledger. The second operation in the ambient electromagnetic power harvesting chip is executed at 616 by transmitting a second electromagnetic signal using the second configuration of RF parameters.

In some embodiments, the server application may communicate with the distributed ledger to obtain information about the object in response to identification information previously read from the AEPH chip. The method may further record operations between the AEPH reader-writer and the AEPH chip to the distributed ledger. In some embodiments, rather than (or in addition to) communicating with the distributed ledger via a server application, the distributed ledger comprises one or more smart contracts that one or more applications (such as Dapps 412) on the AEPH reader-writer interact with directly.

Figure 7A:
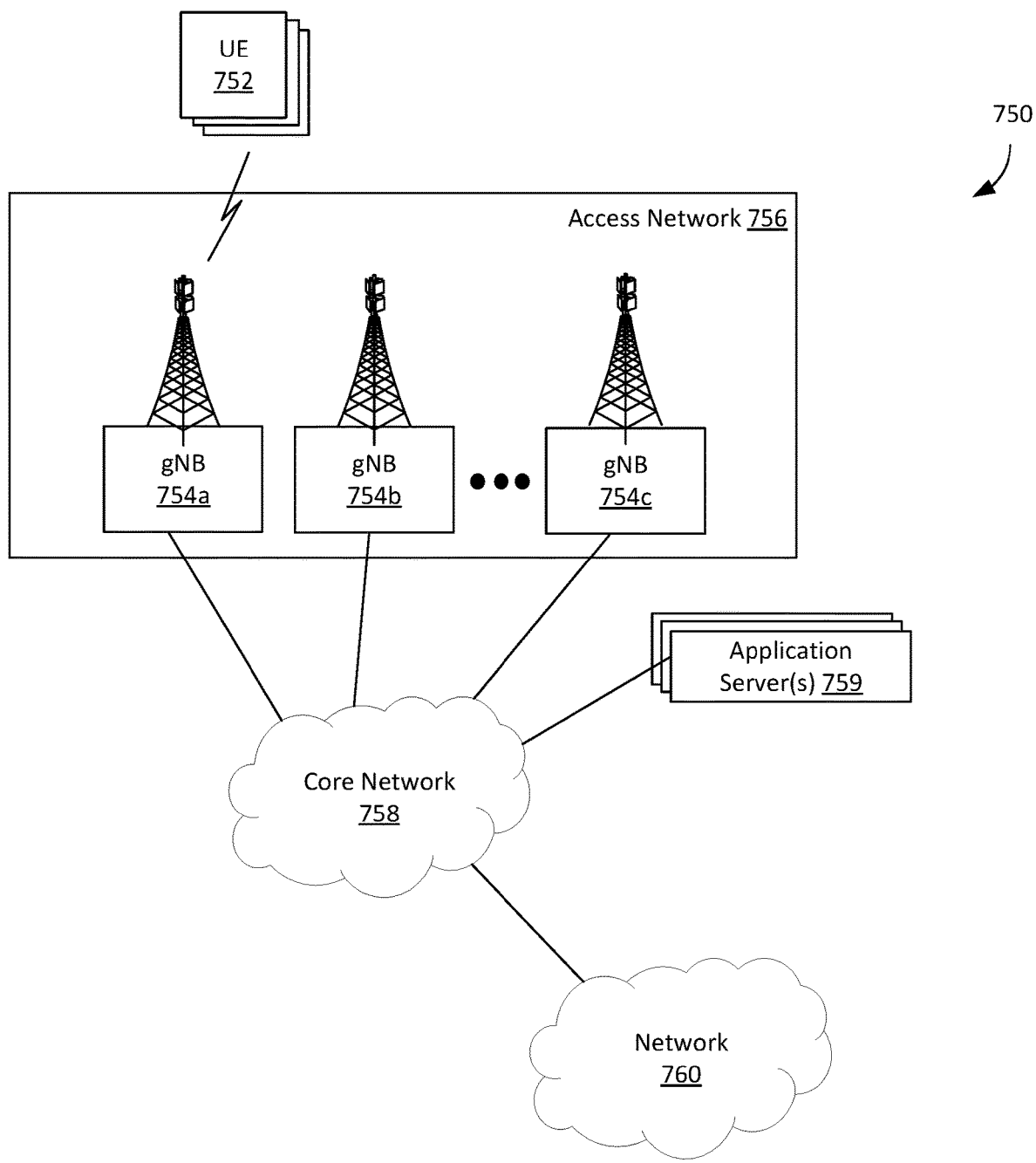
FIGS. 7A and 7B are block diagrams illustrating an example communication network according to an embodiment described herein.

Turning now to FIG. 7A, FIG. 7A illustrates an exemplary communication system 750 according to one embodiment. In an embodiment, at least a portion of the network 130 described herein comprises a communications network consistent with communication system 750. Typically the communication system 750 includes a number of access nodes 754 that are configured to provide wireless network coverage in which UEs 752 such as cell phones, tablet computers, machine-type-communication devices, tracking devices, embedded wireless modules, and/or other wirelessly equipped communication devices (whether or not user operated), can operate. In some embodiments, one or more of the UEs 752 comprise a UE such as the UE 110 with AEPH scanner 116 described herein. In some such embodiments, the network interface 324 of the UE 110 comprises an interface for communicating uplink and downlink wireless RF communications with an access node 754. In some embodiments, one or more of the access nodes 754 define an access network 756, which may be referred to as a radio access network (RAN) in some contexts. In a 5G technology generation an access node 754 may be referred to as a gNodeB (gNB). In 4G technology (e.g., long term evolution (LTE) technology) an access node 754 may be referred to as an evolved NodeB (eNB). In 3G technology (e.g., code division multiple access (CDMA) and global system for mobile communication (GSM)) an access node 754 may be referred to as a base reader-writer station (BTS) combined with a base station controller (BSC). In some contexts, the access node 754 may be referred to as a cell site or a cell tower. In some implementations, a picocell may provide some of the functionality of an access node 754, albeit with a constrained coverage area. Each of these different embodiments of an access node 754 may be considered to provide roughly similar functions in the different technology generations. In still other embodiments, an access node 754 may implement a different wireless network technology such as, but not limited to IEEE 802.11 (WiFi) or IEEE 802.16 (WiMAX) related technologies.

In an embodiment, the access network 756 comprises a first access node 754 a, a second access node 754 b, and a third access node 754 c. It is understood that the access network 756 may include any number of access nodes 754. Further, each access node 754 may be coupled with a core network 758 that provides connectivity with various application servers 759 and/or a network 760 (e.g., such as network 130). In some embodiments, server application 136 and/or distributed ledger 133 are hosted on an application server 759.

In an embodiment, one or more application servers 759 may be located close to the network edge (e.g., geographically close to the UE 752 and the end user) to deliver so-called "edge computing." The network 760 may be one or more private networks, one or more public networks, or a combination thereof. The network 760 may comprise the public switched telephone network (PSTN). The network 760 may comprise the Internet. With this arrangement, a UE 752 within coverage of the access network 756 may engage in air-interface communication with an access node 754 and thereby communicate via the access node 754 with various application servers and other entities.

In some embodiments, communication system 750 operates in accordance with a particular radio access technology (RAT), with communications from an access node 754 to UEs 572 defining a downlink or forward link and communications from the UEs 752 to the access node 754 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), and "5G", which now facilitate mobile broadband service using technologies such as orthogonal frequency division multiplexing (OFDM) and multiple input multiple output (MIMO). "5G" technologies, and particularly "5G NR" (5G New Radio), may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). In some implementations, 5G may provide, for example, as much as 20 gigabits per second (Gbps) downlink data throughput and as much as 10 Gbps uplink data throughput. Each access node 754 may provide service on one or more radio-frequency (RF) carriers, each of which may be frequency division duplex (FDD), with separate frequency channels for downlink and uplink communication, or time division duplex (TDD), with a single frequency channel multiplexed over time between downlink and uplink use. Each such frequency channel may be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 754 may define an air interface configured in a specific manner to define physical resources for carrying information wirelessly between the access node 754 and UEs 752.

Without limitation, for instance, the air interface may be divided over time into frames, subframes, and symbol time segments, and over frequency into subcarriers that may be modulated to carry data. The example air interface may thus define an array of time-frequency resource elements each being at a respective symbol time segment and subcarrier, and the subcarrier of each resource element may be modulated to carry data. Further, in each subframe or other transmission time interval (TTI), the resource elements on the downlink and uplink may be grouped to define physical resource blocks (PRBs) that the access node may allocate as needed to carry data between the access node and served UEs 752. In addition, certain resource elements on the example air interface may be reserved for special purposes. For instance, on the downlink, certain resource elements may be reserved to carry synchronization signals that UEs 752 may detect as an indication of the presence of coverage and to establish frame timing, other resource elements may be reserved to carry a reference signal that UEs 752 may measure in order to determine coverage strength, and still other resource elements may be reserved to carry other control signaling such as PRB-scheduling directives and acknowledgement messaging from the access node 754 to served UEs 752. And on the uplink, certain resource elements may be reserved to carry random access signaling from UEs 752 to the access node 754, and other resource elements may be reserved to carry other control signaling such as PRB-scheduling requests and acknowledgement signaling from UEs 752 to the access node 754. An access node 754, in some instances, may be split functionally into a radio unit (RU), a distributed unit (DU), and a central unit (CU). The RU provides radio functions. The DU provides L1 and L2 real-time scheduling functions, and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 7B:
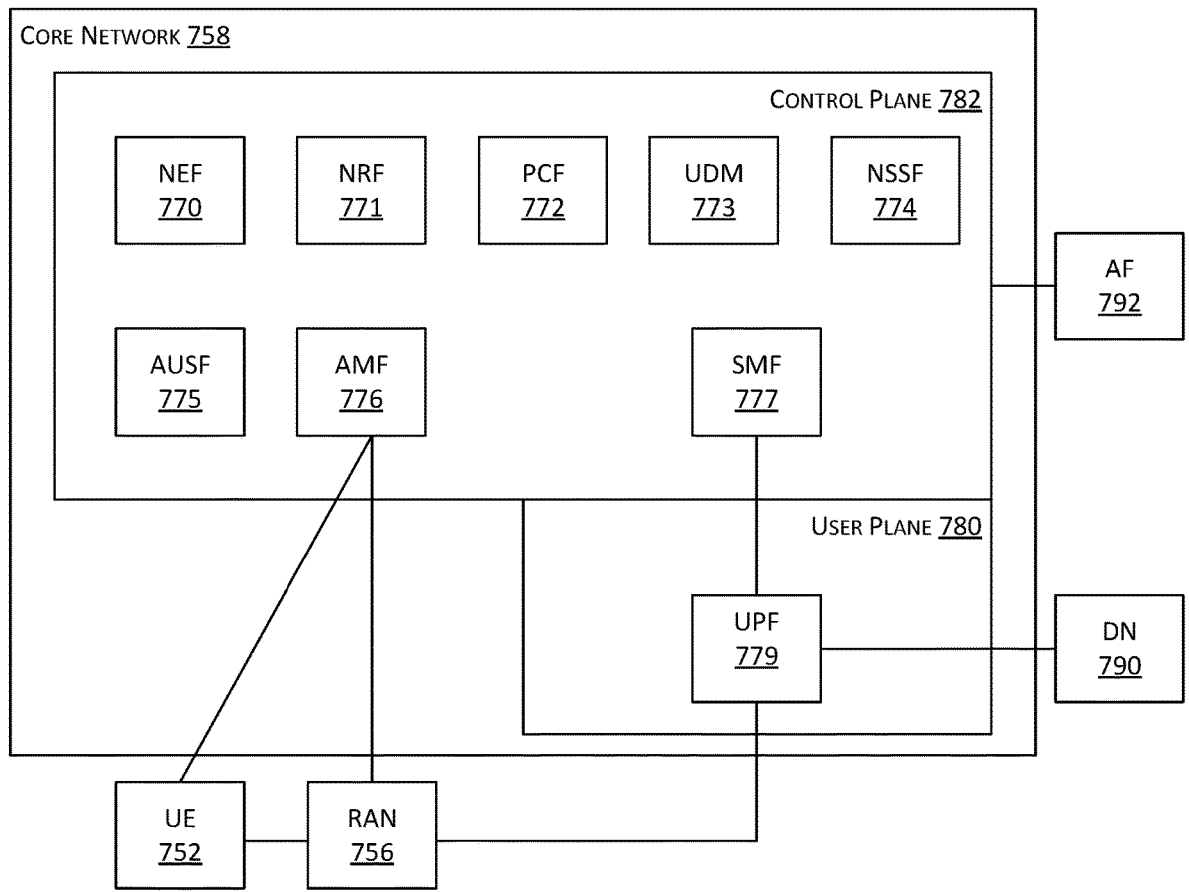

Turning now to FIG. 7B, further details of the core network 758 are described. In an embodiment, the core network 758 is a 5G core network. 5G core network technology is based on a service based architecture paradigm. Rather than constructing the 5G core network as a series of special purpose communication nodes (e.g., an HSS node, a MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 779, an authentication server function (AUSF) 775, an access and mobility management function (AMF) 776, a session management function (SMF) 777, a network exposure function (NEF) 770, a network repository function (NRF) 771, a policy control function (PCF) 772, a unified data management (UDM) 773, a network slice selection function (NSSF) 774, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 758 may be segregated into a user plane 780 and a control plane 782, thereby promoting independent scalability, evolution, and flexible deployment. In some embodiments one or more of the server applications 136 discussed herein that communicate with the AEPH reader-writer 116 and/or distributed ledger 133 are implemented at least in part as microservices by the core network 758.

The UPF 779 delivers packet processing and links the UE 752, via the access network 756, to a data network 790 (e.g., the network 130 illustrated in FIG. 1). The AMF 776 handles registration and connection management of non-access stratum (NAS) signaling with the UE 752. That is, the AMF 776 manages UE registration and mobility issues. The AMF 776 manages reachability of the UEs 752 as well as various security issues. The SMF 777 handles session management issues. Specifically, the SMF 777 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 775 facilitates security processes.

The NEF 770 securely exposes the services and capabilities provided by network functions. The NRF 771 supports service registration by network functions and discovery of network functions by other network functions. The PCF 772 supports policy control decisions and flow based charging control. The UDM 773 manages network user data and can be paired with a user data repository (UDR) that stores user data such as customer profile information, customer authentication number, and encryption keys for the information. An application function 792, which may be located outside of the core network 758, exposes the application layer for interacting with the core network 758. In an embodiment, the application function 792 may be execute on an application server 759 located geographically proximate to the UE 752 in an "edge computing" deployment mode. The core network 758 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 774 can help the AMF 776 to select the network slice instance (NSI) for use with the UE 752.

Figure 8:
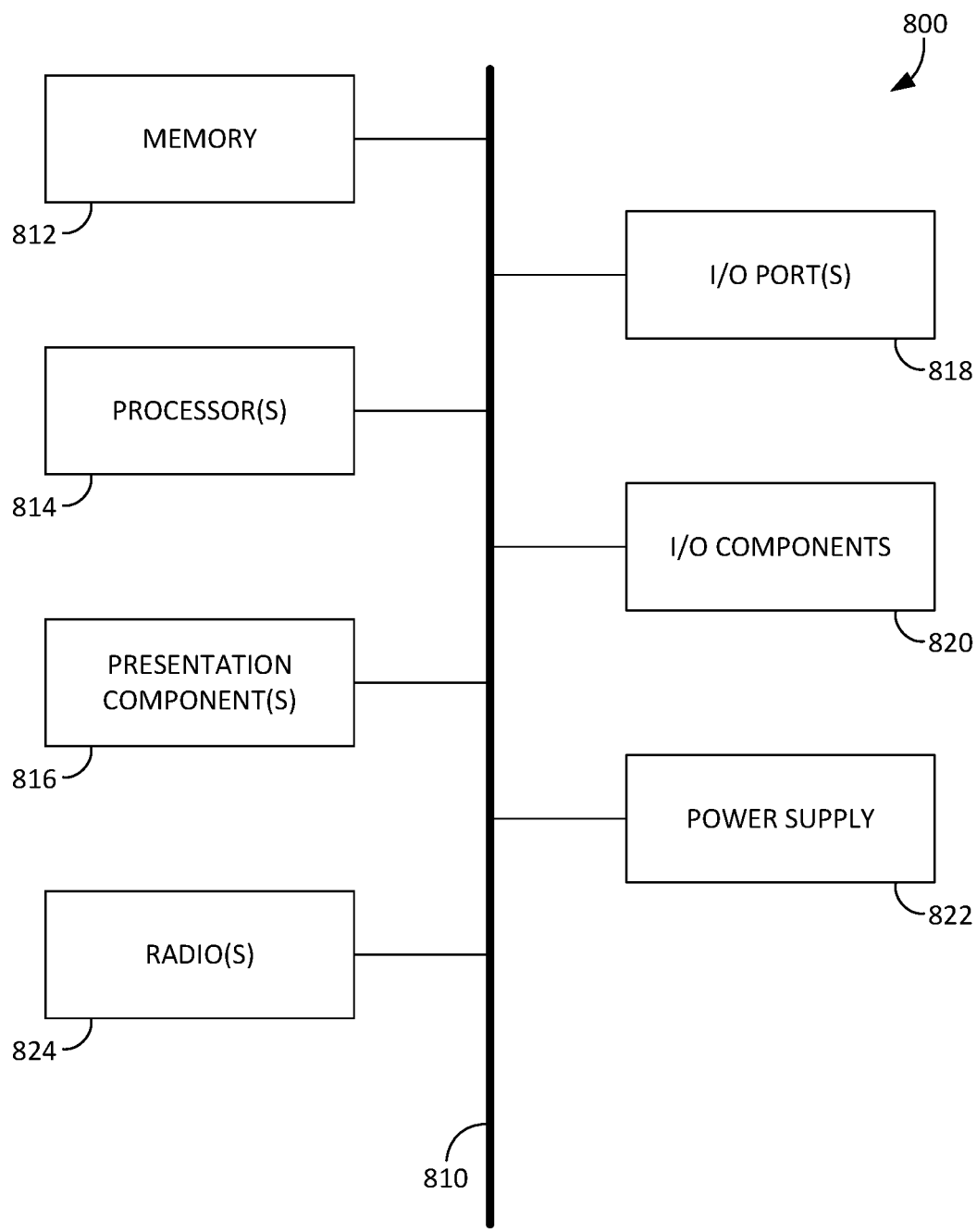
FIG. 8 is diagram illustrating an example computing environment according to an embodiment.

Referring to FIG. 8, a diagram is depicted of an exemplary computing environment suitable for use in implementations of the present disclosure. In particular, the exemplary computer environment is shown and designated generally as computing device 800. Computing device 800 is but one example of a suitable computing environment and is not intended to suggest any limitation as to the scope of use or functionality of the embodiments described herein. Neither should computing device 800 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 8, computing device 800 includes bus 810 that directly or indirectly couples the following devices: memory 812, one or more processors 814, one or more presentation components 816, input/output (I/O) ports 818, I/O components 820, power supply 822, and radio 824. Bus 810 represents what may be one or more busses (such as an address bus, data bus, or combination thereof). The devices of FIG. 8 are shown with lines for the sake of clarity. However, it should be understood that the functions performed by one or more components of the computing device 800 may be combined or distributed amongst the various components. For example, a presentation component such as a display device may be one of I/O components 820. Also, processors, such as one or more processors 814, have memory. The present disclosure hereof recognizes that such is the nature of the art, and reiterates that FIG. 8 is merely illustrative of an exemplary computing environment that can be used in connection with one or more implementations of the present disclosure. Distinction is not made between such categories as "IoT device", "smart appliance", "workstation," "server," "laptop," "handheld device," etc., as all are contemplated within the scope of FIG. 8 and refer to "computer" or "computing device." In some embodiments, the AEPH reader-writer 116 as described in any of the examples of this disclosure may be implemented at least in part by code executed by the one or more processors(s) 814 in conjunction with use of the memory 812.

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes non-transient RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal or signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer-storage media in the form of volatile and/or nonvolatile memory. Memory 812 may be removable, nonremovable, or a combination thereof. Exemplary memory includes solid-state memory, hard drives, optical-disc drives, etc. Computing device 800 includes one or more processors 814 that read data from various entities such as bus 810, memory 812 or I/O components 820. One or more presentation components 816 presents data indications to a person or other device. Exemplary one or more presentation components 816 include a display device, speaker, printing component, vibrating component, etc. I/O ports 818 allow computing device 800 to be logically coupled to other devices including I/O components 820, some of which may be built in computing device 800. Illustrative I/O components 820 include a microphone, joystick, game pad, satellite dish, scanner, printer, wireless device, etc.

Radio(s) 824 represents a radio that facilitates communication with a wireless telecommunications network. Illustrative wireless telecommunications technologies include CDMA, GPRS, TDMA, GSM, and the like. Radio 824 might additionally or alternatively facilitate other types of wireless communications including Wi-Fi, WiMAX, LTE, or other VoIP communications. As can be appreciated, in various embodiments, radio(s) 824 can be configured to support multiple technologies and/or multiple radios can be utilized to support multiple technologies. A wireless telecommunications network might include an array of devices, which are not shown so as to not obscure more relevant aspects of the embodiments described herein. Components such as a base station, a communications tower, or even access points (as well as other components) can provide wireless connectivity in some embodiments. In some embodiments, the RF transmit path circuits 310 and RF receive path circuits for communicating with the AEPH chip 120 each are implemented by one or more radio paths of the radio(s) 824.

In various alternative embodiments, system and/or device elements, method steps, or example implementations described throughout this disclosure (such as the AEPH reader-writer, RF parameter selection processor, applications, server applications, distributed ledgers, or subcomponents thereof, for example) may be implemented at least in part using one or more computer systems, field programmable gate arrays (FPGAs), application specific integrated circuits (ASICs) or similar devices comprising a processor coupled to a memory and executing code to realize that elements, processes, or examples, said code stored on a non-transient hardware data storage device. Therefore, other embodiments of the present disclosure may include elements comprising program instructions resident on computer readable media which when implemented by such computer systems, enable them to implement the embodiments described herein. As used herein, the term "computer-readable media" refers to tangible memory storage devices having non-transient physical forms. Such non-transient physical forms may include computer memory devices, such as but not limited to: punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system of device having a physical, tangible form. Program instructions include, but are not limited to, computer executable instructions executed by computer system processors and hardware description languages such as Very High Speed Integrated Circuit (VHSIC) Hardware Description Language (VHDL).

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

What is claimed is:

1. A system of an ambient electromagnetic power harvesting chip reader-writer, the system comprising:
    a network interface;
    one or more processors; and
    one or more computer-readable media storing computer-usable instructions that, when executed by the one or more processors, cause the one or more processors to:
    transmit, via the network interface, a first information about an ambient electromagnetic power harvesting chip to a server application or a distributed ledger;
    select a first configuration of radio frequency (RF) parameters from a plurality of RF parameters based on a determination of a first operation for execution by an ambient electromagnetic power harvesting chip, and based on a second information received, via the network interface, from the server application or the distributed ledger;
    configure an RF transmit path circuit to use the first configuration of RF parameters; and
    initiate execution of the first operation in the ambient electromagnetic power harvesting chip by transmitting via the RF transmit path circuit a first electromagnetic signal using the first configuration of RF parameters.

2. The system of claim 1, wherein selection of the first configuration of RF parameters comprises selecting a first power level of the first electromagnetic signal corresponding to a power consumption for the ambient electromagnetic power harvesting chip to complete the first operation.

3. The system of claim 1, wherein selection of the first configuration of RF parameters comprises selecting a frequency of the first electromagnetic signal, wherein the frequency corresponds to a predefined trigger frequency for initiating execution of the first operation.

4. The system of claim 1, wherein selection of the first configuration of RF parameters comprises selecting a beamwidth of the first electromagnetic signal.

5. The system of claim 1, wherein selection of the first configuration of RF parameters comprises selecting the first configuration of RF parameters from the plurality of RF parameters based on at least one task associated with the first operation.

6. The system of claim 1, wherein selection of the first configuration of RF parameters comprises selecting the first configuration of RF parameters from the plurality of RF parameters based on information previously received from the ambient electromagnetic power harvesting chip.

7. The system of claim 1, the one or more processors further to:
    determine a second configuration of RF parameters corresponding to a second operation of the ambient electromagnetic power harvesting chip, wherein the second configuration of RF parameters defines a second power level of a second electromagnetic signal corresponding to a power consumption for the ambient electromagnetic power harvesting chip to complete the second operation;
    configure the RF transmit path circuit with the second configuration of RF parameters; and
    initiate execution of the second operation in the ambient electromagnetic power harvesting chip by causing the RF transmit path circuit to transmit the second electromagnetic signal using the second configuration of RF parameters.

8. A method for an ambient electromagnetic power harvesting chip reader-writer, the method comprising:
    selecting a first configuration of radio frequency (RF) parameters from a plurality of RF parameters based on a determination of a first operation for execution by an ambient electromagnetic power harvesting chip;
    configuring an RF transmit path circuit to use the first configuration of RF parameters; and
    initiating execution of the first operation in the ambient electromagnetic power harvesting chip by transmitting via the RF transmit path circuit a first electromagnetic signal using the first configuration of RF parameters;
    wherein the first operation comprises at least one of:
        reading information from a memory of the ambient electromagnetic power harvesting chip;
        saving information to the memory of the ambient electromagnetic power harvesting chip;
        transferring information between a server application or a distributed ledger and the memory of the ambient electromagnetic power harvesting chip; and
        establishing an encrypted communication link between the ambient electromagnetic power harvesting chip and the ambient electromagnetic power harvesting chip reader-writer.

9. The method of claim 8, wherein selecting the first configuration of RF parameters comprises selecting a first power level of the first electromagnetic signal corresponding to a power consumption for the ambient electromagnetic power harvesting chip to complete the first operation.

10. The method of claim 8, wherein selecting the first configuration of RF parameters further comprises selecting a frequency of the first electromagnetic signal, wherein the frequency corresponds to a trigger frequency for initiating execution of the first operation.

11. The method of claim 8, further comprising:
    receiving a first response signal from the ambient electromagnetic power harvesting chip in response to the first electromagnetic signal, the first response signal comprising a first information from a memory of the ambient electromagnetic power harvesting chip;
    retrieving a second information from a distributed ledger based on the first information from the first response signal;
    reconfiguring the RF transmit path circuit with a second configuration of RF parameters to initiate execution of a second operation at least in part based on the second information from the distributed ledger; and
    initiating execution of the second operation in the ambient electromagnetic power harvesting chip by transmitting a second electromagnetic signal using the second configuration of RF parameters.

12. The method of claim 11, further comprising:
receiving a second response signal from the ambient electromagnetic power harvesting chip in response to the second electromagnetic signal; and
transmitting an update to the distributed ledger based at least in part on a response generated by the second operation.

13. The method of claim 11, wherein the second operation comprises at least one of:
transferring a third information between the distributed ledger and the memory of the ambient electromagnetic power harvesting chip; and
establishing an encrypted communication link with the ambient electromagnetic power harvesting chip for transferring the third information.

14. The method of claim 11, wherein selecting the second configuration of RF parameters comprises:
selecting a second power level of the second electromagnetic signal corresponding to a power consumption for the ambient electromagnetic power harvesting chip to complete the second operation; and
selecting a frequency of the second electromagnetic signal corresponding to a trigger frequency for initiating execution of the first operation.

15. The method of claim 11, further comprising:
transmitting a sequence of electromagnetic signal transmissions using the second configuration of RF parameters to execute a set of subtasks of the second operation.

16. A user equipment (UE) for communicating with a communication network, the user equipment comprising:
a radio frequency (RF) transmit path circuit and a RF receive path circuit, configured to communicate with an ambient electromagnetic power harvesting chip;
a network interface;
one or more processors; and
one or more computer-readable storage media storing computer-usable instructions that, when executed by the one or more processors, cause the one or more processors to:
transmit, via the network interface, a first information about the ambient electromagnetic power harvesting chip to a server application or a distributed ledger;
execute an RF parameter selection processor performing one or more operations to select a first configuration of radio frequency (RF) parameters from a plurality of RF parameters based on a determination of a first operation for execution by the ambient electromagnetic power harvesting chip, and based on a second information received, via the network interface, from the server application or the distributed ledger; and
initiate execution of the first operation in the ambient electromagnetic power harvesting chip by transmitting via the RF transmit path circuit a first electromagnetic signal using the first configuration of RF parameters.

17. The user equipment of claim 16, wherein the RF parameter selection processor selects a first power level of the first electromagnetic signal corresponding to a power consumption for the ambient electromagnetic power harvesting chip to complete the first operation, and selects a frequency of the first electromagnetic signal corresponding to a trigger frequency for initiating execution of the first operation.

18. The user equipment of claim 16, the RF parameter selection processor performing one or more further operations to:
determine a second configuration of RF parameters corresponding to a second operation of the ambient electromagnetic power harvesting chip, wherein the second configuration of RF parameters defines a second power level of a second electromagnetic signal corresponding to a power consumption for the ambient electromagnetic power harvesting chip to complete the second operation;
configure the RF transmit path circuit to use the second configuration of RF parameters; and
initiate execution of the second operation in the ambient electromagnetic power harvesting chip by causing the RF transmit path circuit to transmit the second electromagnetic signal using the second configuration of RF parameters.

* * * * *